(12) United States Patent
Biswas et al.

(10) Patent No.: US 10,590,034 B2
(45) Date of Patent: Mar. 17, 2020

(54) HEAT TREATABLE COATED ARTICLE FOR USE IN BACKSPLASH APPLICATIONS

(71) Applicant: GUARDIAN GLASS HOLDING S.P.C., Manama (BH)

(72) Inventors: Aritra Biswas, Ras Al Khaimah (AE); Gpoal Balachandran, Ras Al Khaimah (AE)

(73) Assignee: GUARDIAN GLASS HOLDING S.P.C., Manama (BH)

( * ) Notice: Subject to any disclaimer, the term of this patent is extended or adjusted under 35 U.S.C. 154(b) by 0 days.

(21) Appl. No.: 16/469,194

(22) PCT Filed: Dec. 16, 2016

(86) PCT No.: PCT/IB2016/057736
§ 371 (c)(1),
(2) Date: Jun. 13, 2019

(87) PCT Pub. No.: WO2018/109534
PCT Pub. Date: Jun. 21, 2018

(65) Prior Publication Data
US 2019/0382306 A1      Dec. 19, 2019

(51) Int. Cl.
| | | |
|---|---|---|
| B32B 15/04 | (2006.01) | |
| B32B 17/06 | (2006.01) | |
| C03C 17/34 | (2006.01) | |
| C03C 17/36 | (2006.01) | |

(52) U.S. Cl.
CPC ...... *C03C 17/3435* (2013.01); *C03C 17/3423* (2013.01); *C03C 17/3618* (2013.01); *C03C 17/3626* (2013.01); *C03C 17/3649* (2013.01); *C03C 2218/155* (2013.01)

(58) Field of Classification Search
USPC ................ 428/426, 428, 432, 434, 701, 702
See application file for complete search history.

(56) References Cited

U.S. PATENT DOCUMENTS

| | | |
|---|---|---|
| 7,269,928 B2 | 9/2007 | Roberts et al. |
| 7,597,965 B2* | 10/2009 | Blacker ............... C03C 17/3626 428/432 |
| 7,941,988 B2 | 5/2011 | Mars |
| 8,096,093 B1 | 1/2012 | Poon |
| 8,286,395 B2* | 10/2012 | Mauvernay ......... C03C 17/3435 52/204.5 |
| 8,539,736 B1 | 9/2013 | Claramonte |
| 9,150,003 B2* | 10/2015 | Dietrich .................... B32B 5/00 |
| 2004/0214013 A1* | 10/2004 | Stachowiak ............ C03C 17/36 428/426 |

(Continued)

*Primary Examiner* — Lauren R Colgan

(57) ABSTRACT

Coated articles for use in backsplash applications such as kitchen backsplashes, bathroom backsplashes, and bathroom floor/wall applications. The coated article includes a coating on a glass substrate, where the coating includes a plurality of dielectric layers and a plurality of metal-based layers and is configured so that the coated article has desirable glass side reflective coloration (e.g., bronze, blue, silver, and/or grey coloration) and is sufficiently opaque to hide adhesive used to adhere the coated article to walls/floors. The coating may be configured to realize thermal stability in order to have minimal or reduced glass side reflective color shift up heat treatment (e.g., thermal tempering).

24 Claims, 1 Drawing Sheet

(56) References Cited

U.S. PATENT DOCUMENTS

| | | | | |
|---|---|---|---|---|
| 2004/0224167 | A1* | 11/2004 | Stachowiak | B32B 17/10174 428/432 |
| 2005/0079369 | A1* | 4/2005 | Stachowiak | B32B 17/06 428/469 |
| 2005/0123772 | A1* | 6/2005 | Coustet | C03C 17/36 428/432 |
| 2006/0159933 | A1* | 7/2006 | Disteldorf | C03C 17/3435 428/432 |
| 2008/0311389 | A1* | 12/2008 | Roquiny | C03C 17/36 428/336 |
| 2009/0068447 | A1* | 3/2009 | Blacker | C03C 17/366 428/336 |
| 2009/0176086 | A1* | 7/2009 | Martin | B32B 17/10174 428/332 |
| 2010/0062245 | A1* | 3/2010 | Martin | B32B 17/10174 428/336 |
| 2011/0261442 | A1* | 10/2011 | Knoll | C03C 17/36 359/360 |
| 2011/0262726 | A1* | 10/2011 | Knoll | C03C 17/36 428/213 |
| 2012/0164443 | A1* | 6/2012 | Durandeau | C03C 17/3435 428/336 |
| 2012/0177899 | A1* | 7/2012 | Unquera | C03C 17/36 428/213 |
| 2013/0216861 | A1* | 8/2013 | Imran | C23C 14/35 428/630 |
| 2014/0071524 | A1* | 3/2014 | Disteldorf | C03C 17/3441 359/360 |
| 2016/0002101 | A1* | 1/2016 | Mahieu | C03C 17/3618 359/359 |
| 2016/0023942 | A1* | 1/2016 | Mahieu | C03C 17/36 428/336 |
| 2016/0145151 | A1* | 5/2016 | Mahieu | C03C 17/3618 428/213 |
| 2017/0260087 | A1* | 9/2017 | Disteldorf | C03C 17/3618 |
| 2017/0267578 | A1* | 9/2017 | Disteldorf | C03C 17/3613 |
| 2017/0267579 | A1* | 9/2017 | Lingle | C03C 17/3626 |
| 2017/0267580 | A1* | 9/2017 | Lingle | C03C 17/3626 |
| 2018/0187477 | A1* | 7/2018 | Tucker | C03C 17/3435 |

* cited by examiner

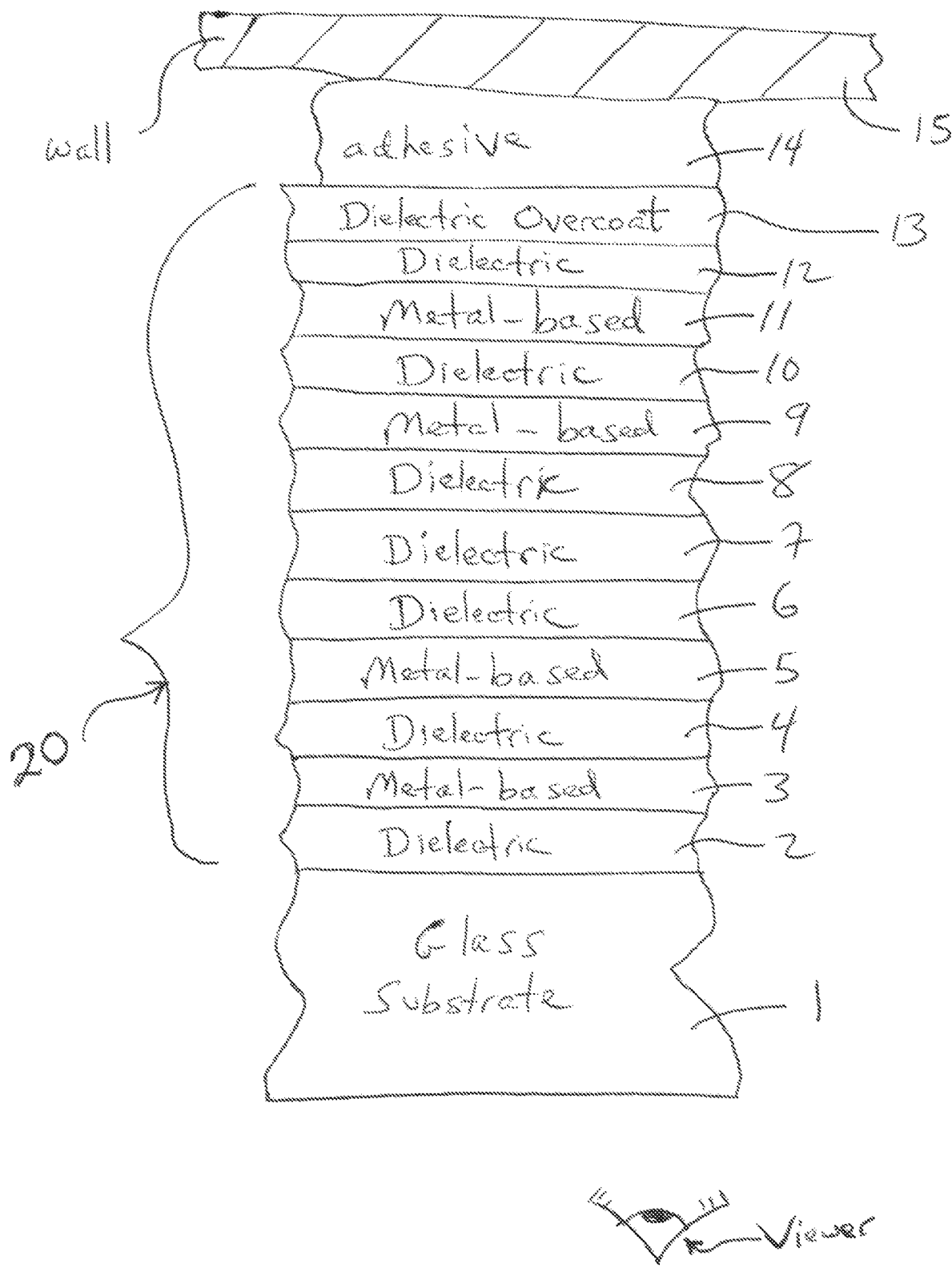

HEAT TREATABLE COATED ARTICLE FOR USE IN BACKSPLASH APPLICATIONS

This application is the U.S. national phase of International Application No. PCT/IB2016/057736, filed Dec. 16, 2016, the entire content of which is hereby incorporated herein by reference in its entirety.

This invention relates to coated articles for use in backsplash applications such as kitchen backsplashes, bathroom backsplashes, and bathroom floor/wall applications. The coated article includes a coating on a glass substrate, where the coating includes a plurality of dielectric layers and a plurality of metal-based layers and is configured so that the coated article has desirable glass side reflective coloration (e.g., bronze, blue, silver, and/or grey coloration) and is sufficiently opaque to hide adhesive used to adhere the coated article to walls/floors. The coated article may be heat treated (e.g., thermally tempered) in certain example embodiments of this invention. In certain example embodiments, the coating is configured to realize glass side reflective thermal stability (low glass side reflective $\Delta E^*$ value(s)) in order to have minimal or reduced glass side reflective color shift up heat treatment (e.g., thermal tempering).

BACKGROUND AND SUMMARY OF THE INVENTION

U.S. Patent Document 2012/0177899 discloses several different coatings. For instance, Examples 1 and 4 on page four of US '899 are glass/SiN/NiCrNx/SiN/NiCrNx/SiN. However, these coatings are designed for solar control window applications and thus have high visible transmissions. For instance, the coated article of Example 1 in US '899 has a visible transmission of 21.76%, and the coated article of Example 4 in US '899 has a visible transmission of 21.07%. These high visible transmissions effectively mean that the coated articles of US '899 cannot be used in backsplash applications because unsightly adhesive between the coated article and a wall would be visible to a viewer and be aesthetically displeasing.

U.S. Pat. No. 8,286,395 discloses in Comparative Example 2 a coating as follows: glass/SiN/NbN/SiN/NbN/SiN. However, this coating is also designed for solar control window applications and thus has a high visible transmission. For instance, the coated article of Comparative Example 2 in US '395 has a visible transmission of 21%. This high visible transmission effectively mean that the coated articles of US '395 also cannot be used in backsplash applications because unsightly adhesive between the coated article and a wall would be visible to a viewer and be aesthetically displeasing.

In certain example embodiments of this invention, there is provided a coated article for use in backsplash applications such as kitchen backsplashes, bathroom backsplashes, and bathroom floor/wall applications. The coated article includes a coating on a glass substrate, where the coating includes a plurality of dielectric layers and a plurality of metal-based layers and is configured so that the coated article has desirable glass side reflective coloration (e.g., bronze, blue, silver, and/or grey coloration) and is sufficiently opaque to hide adhesive used to adhere the coated article to walls/floors. In certain example embodiments, the dielectric layers may be substantially transparent to visible light and may be of or including silicon nitride, silicon oxynitride, zirconium oxide, or other suitable dielectric material. In certain example embodiments, one or more of the metal-based layers may be designed to absorb visible light and may be of or include material such as $NbZrO_x$, $NbZrN_x$, $NbZrO_xN_y$, $NiCrN_x$, $NiCrO_x$, $NiCrO_xN_y$, $NiCrMoO_x$, $NiCrMoN_x$, $NbCrO_x$, $NbCrN_x$, $NbCrO_xN_y$, $NbO_x$ and/or $NbN_x$. Such nitrides may be full or partial nitrides, and such oxides are preferably suboxides in order to reduce visible transmission through the coating so that the coating can be sufficiently opaque to hide adhesive used to adhere the coated article to walls/floors. The coated article may be heat treated (e.g., thermally tempered) in certain example embodiments of this invention. In certain example embodiments, the coating is configured to realize glass side reflective thermal stability (low glass side reflective $\Delta E^*$ value(s)) in order to have minimal or reduced glass side reflective color shift up heat treatment (e.g., thermal tempering), so that both heat treated and non-heat treated versions of the coated article have similar appearances and can be used together and/or for similar applications. While coated articles herein are preferably used for such backsplash applications, this invention is not so limited.

In certain example embodiments of this invention, coated articles have a visible transmission of from 0-4%, more preferably from 0-3%, even more preferably from 0-1%, even more preferably from 0 to 0.5%, and most preferably from 0 to 0.1%.

In certain example embodiments of this invention, the coated articles are designed to have thermal stability so that upon heat treatment (HT) coated articles have a glass side reflective $\Delta E^*$ value due to heat treatment (e.g., thermal tempering) of no greater than 4.0, more preferably no greater than 3.0, even more preferably no greater than 2.0, and most preferably no greater than 1.7.

In certain example embodiments of this invention, there is provided a backsplash coated article including a coating supported by a glass substrate, the coating comprising: a first dielectric layer; a first metal based absorber layer over at least the first dielectric layer; a second dielectric layer over at least the first dielectric layer and the first metal based absorber layer; a second metal based absorber layer on the glass substrate over at least the first and second dielectric layers and the first metal based absorber layer; a third dielectric layer on the glass substrate over at least the first and second dielectric layers and the first and second metal based absorber layer; a third metal based absorber layer on the glass substrate over at least the first, second and third dielectric layers and the first and second metal based absorber layers; a fourth dielectric layer on the glass substrate over at least the first, second and third dielectric layers and the first, second and third metal based absorber layers; wherein the backsplash coated article has a visible transmission of 0-4%; and wherein the backsplash coated article is configured to be adhered to a wall or floor so that the coating is to be located between at least the glass substrate and the wall or floor.

In certain example embodiments of this invention, there is provided coated article including a coating supported by a glass substrate, the coating comprising: a first dielectric layer; a first metal based absorber layer over at least the first dielectric layer; a second dielectric layer over at least the first dielectric layer and the first metal based absorber layer; a second metal based absorber layer on the glass substrate over at least the first and second dielectric layers and the first metal based absorber layer; a third dielectric layer on the glass substrate over at least the first and second dielectric layers and the first and second metal based absorber layer; a third metal based absorber layer on the glass substrate over at least the first, second and third dielectric layers and the first and second metal based absorber layers; a fourth dielectric layer on the glass substrate over at least the first, second and third dielectric layers and the first, second and third metal based absorber layers; wherein the coated article has a visible transmission of 0-4%, a sheet resistance ($R_s$) of no greater than 40 ohms/square, and a glass side visible reflectance of from 15-40%; and wherein the coated article is configured to be adhered to a wall so that the coating is to be located between at least the glass substrate and the wall.

IN THE DRAWINGS

FIG. 1 is a partial cross sectional view of a monolithic coated article (heat treated or not heat treated) according to an example embodiment of this invention.

DETAILED DESCRIPTION OF CERTAIN EXAMPLE EMBODIMENTS OF THE INVENTION

Referring now more particularly to the accompanying drawings in which like reference numerals indicate like parts throughout the several views.

In certain example embodiments of this invention, there is provided a coated article for use in backsplash applications such as kitchen backsplashes, bathroom backsplashes, and bathroom floor/wall applications. Thus, such coated article may be used in tile backsplash applications. The coated article includes a coating 20 on a glass substrate 1, where the coating 20 may include a plurality of dielectric layers (e.g., 2, 4, 6, 7, 8, 10, 12, 13) and a plurality of metal-based layers (e.g., 3, 5, 9, 11) and is configured so that the coated article has desirable glass side reflective coloration (e.g., bronze, blue, silver, and/or grey coloration) and is sufficiently opaque to hide adhesive 14 used to adhere the coated article to walls/floors 15. In certain example embodiments, the dielectric layers (e.g., 2, 4, 6, 7, 8, 10, 12, 13) may be substantially transparent to visible light and may be of or including silicon nitride, silicon oxynitride, zirconium oxide, or other suitable dielectric material. In certain example embodiments, one or more of the metal-based layers (e.g., 3, 5, 9, 11) may be designed to absorb visible light and may be of or include material such as $NbZrO_x$, $NbZrN_x$, $NbZrO_xN_y$, $NiCrN_x$, $NiCrO_x$, $NiCrO_xN_y$, $NiCrMoO_x$, $NiCrMoN_x$, $NbCrO_x$, $NbCrN_x$, $NbCrO_xN_y$, $NbO_x$ and/or $NbN_x$. Such nitrides in layers (e.g., 3, 5, 9, 11) may be full or partial nitrides, and such oxides in layers (e.g., 3, 5, 9, 11) are preferably suboxides in order to reduce visible transmission through the coating so that the coating can be sufficiently opaque to hide adhesive used to adhere the coated article to walls/floors. In certain example embodiments, at least part of the coating has metal-based absorber layers that alternate with transparent dielectric layers. In certain preferred embodiments, one or more of the metal based layers (e.g., 3, 5, 9, 11) are not purely metallic because this would result in thermal instability (higher glass side reflective ΔE* value(s)) including increased color shift upon heat treatment such as thermal tempering. The coated article may or may not be heat treated (e.g., thermally tempered) in certain example embodiments of this invention. In certain example embodiments, the coating is configured to realize glass side reflective thermal stability (low glass side reflective ΔE* value(s)) in order to have minimal or reduced glass side reflective color shift up heat treatment (e.g., thermal tempering), so that both heat treated and non-heat treated versions of the coated article have similar appearances and can be used together and/or for similar applications. While coated articles herein are preferably used for such backsplash applications, this invention is not so limited and coated articles according to this invention may be used in other applications such as spandrel applications on building exteriors and/or in other exterior building applications.

In certain example embodiments of this invention, coated articles have a visible transmission ($T_{vis}$ or TY) of from 0-4%, more preferably from 0-3%, even more preferably 0-1%, even more preferably from 0 to 0.5%, and most preferably from 0 to 0.1%. In certain example embodiments of this invention, the coated articles are designed to have thermal stability so that upon heat treatment (HT) coated articles have a glass side reflective ΔE* value due to heat treatment (e.g., thermal tempering) of no greater than 4.0, more preferably no greater than 3.0, even more preferably no greater than 2.0, and most preferably no greater than 1.7. For purposes of example, the heat treatment (HT) may be for at least about 5 minutes at a temperature(s) of at least about 580 degrees C., and is sufficient for thermal tempering. The term ΔE* is known in the art and is indicative of thermal stability upon heat treatment, and is defined and explained for example in U.S. Pat. No. 6,926,967 which is incorporated herein by reference. With respect to stability upon heat treatment (HT), this means a low value of ΔE*; where Δ is indicative of a*, b* and L* change in view of HT such as thermal tempering, heat bending, or thermal heat strengthening. In certain exemplary embodiments, the color stability with HT may result in substantial matchability between heat-treated and non-heat treated versions of the coating or layer system. In other words, in certain embodiments of this invention two glass substrates having the same coating system thereon (one HT after deposition and the other not HT) appear to the naked human eye to look substantially the same.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Because coated articles according to certain example embodiments of this invention are adhered to a wall or floor 15 via their coating 20 side as shown in FIG. 1 (i.e., the coated side of the glass substrate faces the wall/floor), it is the glass side reflective coloration of the coated article that a viewer sees and which is designed to make the coated articles aesthetically pleasing. In this respect, glass side visible reflectance ($R_GY$) of coated articles is as viewed from the glass side thereof (as opposed to the coating side) and is the visible reflectance for example in a kitchen or bathroom when the coated article is attached to a wall/floor as shown in FIG. 1. In certain example embodiments of this invention, the coating 20 is designed so that the coated article has a glass side visible reflectance ($R_GY$) (which is from the point of view of the viewer shown in FIG. 1) of 10-45%, more preferably from 15-40%, and most preferably from 25-35%. With respect to coloration, the coating may be designed so that the coated article has a glass side reflective a* color value ($a^*_G$) of from −10 to +10, more preferably from −8 to +6, more preferably from −5 to +1, and most preferably from −3 to 0; and a glass side reflective b* color value ($b^*_G$) of from −20 to +20, more preferably from −10 to +10, more preferably from −5 to +8, and most preferably from −1 to +3, measured monolithically before and/or after heat treatment (HT) such as thermal tempering.

FIG. 1 is a side cross sectional view of a coated article according to example embodiment of this invention, where the coated article is adhered to a wall or floor 15 via adhesive 14. The adhesive 14 may be any suitable adhesive such as silicone based adhesive, or any other suitable adhesive. FIG. 1 shows that the coated side of the glass substrate is adhered to the wall/floor 15, so that the coating 20 is located between the wall/floor 15 and the glass substrate 1. In the FIG. 1 embodiment the coated article includes glass substrate 1 (e.g., clear, green, bronze, grey, blue, or blue-green glass substrate from about 1.0 to 12.0 mm thick), and coating 20 which includes substantially transparent dielectric layers 2, 4, 6, 7, 8, 10, 12 and 13, and metal based absorbing layers 3, 5, 9 and 11. The dielectric layers 2, 4, 6, 7, 8, 10, 12 and 13 may be of or including silicon nitride (which may be doped with aluminum, stainless steel, or the like), silicon oxynitride, zirconium oxide, or other suitable dielectric material, and the metal-based absorbing layers 3, 5, 9, and 11 may be of or include $NbZrO_x$, $NbZrN_x$, $NbZrO_xN_y$, $NiCrN_x$, $NiCrO_x$, $NiCrO_xN_y$, $NiCrMoO_x$, $NiCrMoN_x$, $NbCrO_x$, $NbCrN_x$, $NbCrO_xN_y$, $NbO_x$ and/or $NbN_x$. Such nitrides in absorbing metal-based layers 3, 5, 9, 11 may be full or partial nitrides, and such oxides in these absorbing metal based layers are preferably suboxides in order to reduce visible transmission through the coating so that the coating can be sufficiently opaque (little or no visible transmission) to hide from the viewer adhesive 14 used to adhere the coated article to walls/floors 15. In certain preferred embodiments, one or more of the metal based layers 3, 5, 9, 11 are not purely metallic because this would result in thermal instability (higher glass side reflective $\Delta E^*$ value(s)) including increased color shift upon heat treatment such as thermal tempering. In certain example embodiments, one, two, three, or all four of the metal-based absorbing layers 3, 5, 9, 11 may have an oxygen content of from 1-35%, more preferably from 3-25%, and most preferably from 5-20% (atomic % of the layer). In certain example embodiments, each absorbing metal-based layer 3, 5, 9 and 11 is located between and contacting a pair of transparent dielectric layers, and does not physically contact any other absorbing metal-based layer.

In certain example embodiments of this invention, dielectric layers 2, 4, 6, 8, 10, and 12 may each have an index of refraction "n" of from 1.7 to 2.7 (at 550 nm), more preferably from 1.9 to 2.5 in certain embodiments, and most preferably from about 2.0 to 2.06. One, two, three, four, five, or all of these layers may be of or include silicon nitride and/or silicon oxynitride in certain example embodiments of this invention. In such embodiments of this invention where these layers comprise silicon nitride (e.g., $Si_3N_4$), sputtering targets including Si employed to form these layers may or may not be admixed with up to 1-20%, more preferably from 1-9% (e.g., 8%) by weight aluminum or stainless steel (e.g. SS #316), with about this amount then appearing in the layers 2, 4, 6, 8, 10, and 12 so formed. Even with this amount(s) of aluminum and/or stainless steel, such layers are still considered dielectric layers.

Optional dielectric layer 7 and overcoat dielectric layer 13 may be of or including a protective material such as zirconium oxide (e.g., $ZrO_2$) or silicon oxynitride. Zirconium oxide may be more protective (e.g., scratch resistant) than silicon nitride.

In certain example embodiments, it is possible for each of the layers to include other materials such as dopants. It will be appreciated of course that other layers may also be provided, or certain layers may be omitted, and different materials may be used, in certain alternative embodiments of this invention. For instance, layer 7 may be omitted in certain example embodiments of this invention, and/or additional metal-based absorbing layers and/or transparent dielectric layers may be provided in the coating in certain example embodiments of this invention. As another example, layers 2, 3 and 7 may be omitted from the coating 20 in certain example embodiments of this invention.

It is noted that the terms "oxide" and "nitride" as used herein include various stoichiometries. For example, the term silicon nitride (for one or more of the transparent dielectric layers) includes stoichiometric $Si_3N_4$, as well as non-stoichiometric silicon nitride. Likewise, various stoichiometries may be used. For instance, when NbZr is used as a metal base of the metal based absorbing layer(s) 3, 5, 9 and/or 11, various ratios of Nb to Zr may be used including but not limited to a 50/50 ratio of Nb to Zr, an 85/15 ratio or Nb to Zr, or a 90/10 ratio of Nb to Zr. In certain example embodiments of this invention, the Nb/Zr ratio in layers 3, 5, 9 and/or 11 may be from 1/1 to 9.5/1 in various example embodiments of this invention, such that these layers preferably contain more Nb than Zr, more preferably at least twice as much Nb as Zr. The illustrated layers may be deposited on glass substrate 1 via magnetron sputtering, any other type of sputtering, or via any other suitable technique in different embodiments of this invention. It is noted that other layer(s) may be provided in the stack shown in FIG. 1 such as between layers 2 and 3, or between layers 3 and 4, or between the substrate 1 and layer 2, or the like. Generally, other layer(s) may also be provided in other locations of the coating. Thus, while the coating 20 is "on" or "supported by" substrate 1 (directly or indirectly), other layer(s) may be provided therebetween. Thus, for example, the layer systems and layers thereof shown in FIG. 1 are considered "on" the substrate 1 even when other layer(s) may be provided therebetween (i.e., the terms "on" and "supported by" as used herein are not limited to directly contacting). However, there may be the direct contacts as shown in FIG. 1 in certain example embodiments.

Turning back to the FIG. 1 embodiment, various thicknesses may be used consistent with one or more of the needs discussed herein. According to certain example embodiments of this invention, example thicknesses (in angstroms) and example materials for the respective layers of the FIG. 1 embodiment on the glass substrate 1 are as follows in certain example embodiments for achieving desired visible transmission, glass side visible reflectance, and glass side reflective coloration (layers are listed in order moving away from the glass substrate 1):

TABLE 1

(Example thicknesses/materials in FIG. 1 embodiment)

| Layer | Example Range (Å) | Preferred (Å) | Best (Å) |
|---|---|---|---|
| silicon nitride (layer 2): | 40-400 Å | 100-250 Å | 130-190 Å |
| absorber (e.g., $NbZrO_x$) (layer 3): | 40-400 Å | 100-250 Å | 130-190 Å |
| silicon nitride (layer 4): | 100-1000 Å | 300-700 Å | 400-600 Å |

TABLE 1-continued (Example thicknesses/materials in FIG. 1 embodiment)

| Layer | Example Range (Å) | Preferred (Å) | Best (Å) |
|---|---|---|---|
| absorber (e.g., NbZrO$_x$) (layer 5): | 20-350 Å | 30-100 Å | 40-70 Å |
| silicon nitride (layer 6): | 50-500 Å | 100-320 Å | 180-260 Å |
| zirconium oxide (e.g., ZrO$_2$) (layer 7): | 20-250 Å | 30-100 Å | 40-70 Å |
| silicon nitride (layer 8): | 50-600 Å | 100-400 Å | 200-300 Å |
| absorber (e.g., NbZrO$_x$) (layer 9): | 100-900 Å | 400-850 Å | 550-750 Å |
| silicon nitride (layer 10): | 100-1000 Å | 300-750 Å | 400-650 Å |
| absorber (e.g., NbZrO$_x$) (layer 11): | 50-500 Å | 100-400 Å | 200-280 Å |
| silicon nitride (layer 12): | 50-600 Å | 100-400 Å | 200-300 Å |
| overcoat (e.g., ZrO$_2$) (layer 13): | 20-250 Å | 30-100 Å | 40-70 Å |

In certain example embodiments, the metal based absorber layers (3, 5, 9 and/or 11) in Table 1 above may be nitrided instead of, or in addition to, being suboxided. In certain example embodiments, metal-based absorber layer 9 is thicker than the other metal-based absorber layers 3, 5 and 11. For example, metal based absorber layer 9 may be at least 100 angstroms thicker than each of metal based absorber layers 3 and 5, more preferably at least 200 angstroms thicker, and most preferably at least 300 angstroms thicker. And metal based absorber layer 9 may be at least 50 angstroms thicker than metal based absorber layer 11, more preferably at least 150 angstroms thicker, and most preferably at least 250 angstroms thicker. In certain example embodiments, one or both of zirconium oxide inclusive dielectric layers 7 and 13 may be at least 50 angstroms thinner than each of dielectric layers 4, 6, 8, 10 and 12, more preferably at least 100 angstroms thinner.

Before and/or after any optional heat treatment (HT) such as thermal tempering, in certain example embodiments of this invention coated articles according to the FIG. 1 embodiment have color/optical characteristics as follows in Table 2 (measured monolithically). It is noted that subscript "G" stands for glass side reflective, subscript "T" stands for transmissive, and subscript "F" stands for film side. As is known in the art, glass side (G) means when viewed from the glass side (as opposed to the layer/film side) of the coated article. Film side (F) means when viewed from the side of the coated article on which the coating is provided. Table 3 set forth below illustrates certain characteristics of coated articles according to certain example embodiments of this invention after HT such as thermal tempering (monolithically measured) for all colors. The characteristics below in Table 2 are applicable to HT and non-HT coated articles herein, except that the thermal stability data in Table 3 relates to HT coated articles and demonstrates stability upon HT.

TABLE 2

Color/Optical Characteristics (FIG. 1 embodiment before and/or after HT)

| | General | Preferred | Most Preferred |
|---|---|---|---|
| T$_{vis}$ (TY): | 0-4.0% | 0-3.0% | 0-1.0% (or 0-0.5%) |
| R$_G$Y (glass side): | 10-45% | 15-40% | 25-35% |
| L*$_G$ | 40-75 | 50-70 | 55-65 |
| a*$_G$ | −10 to +10 | −8 to +6 | −5 to +1 (or −3 to 0) |
| b*$_G$ | −20 to +20 | −10 to +10 | −5 to +8 (or −1 to +3) |
| R$_F$Y (film side): | 10-35% | 14-25% | 16-22% |
| a*$_F$ | −15 to +15 | −5 to +10 | 0 to +6 |

TABLE 2-continued

Color/Optical Characteristics (FIG. 1 embodiment before and/or after HT)

| | General | Preferred | Most Preferred |
|---|---|---|---|
| b*$_F$ | −50 to +50 | −20 to +40 | +15 to +35 |
| R$_s$ (Ω/sq): | ≤40 | ≤25 | 10-21 |

TABLE 3

Thermal Stability (FIG. 1 after HT; in addition to Table 2)

| | General | Preferred | Most Preferred |
|---|---|---|---|
| ΔE*$_G$ | ≤4.0 | ≤3.0 | ≤2.0 (or ≤1.7) |

For purposes of example only, an Example coated article is set forth below.

Example

Example 1 was a layer stack on a clear glass substrate as shown in FIG. 1. It was measured monolithically, heat treated and measured again to obtain ΔE*$_G$. The silicon nitride layers in each example were deposited by sputtering a silicon target(s) (doped with about 8% Al) in an atmosphere including argon and nitrogen gas. The glass substrate 1 was clear and 6 mm thick. The NbZrO$_x$ layers were deposited by sputtering approximately 90/10 Nb/Zr magnetron sputtering targets in an atmosphere including argon and a small amount of oxygen gas. Layer thicknesses were in angstroms (Å), with data taken from the center of the coated article (layers are listed in order moving away from the glass substrate 1).

TABLE 4

Layer Stack of Example

| Layer | Physical thickness (Å) |
|---|---|
| silicon nitride (layer 2): | 169 Å |
| absorber (NbZrO$_x$) (layer 3): | 159 Å |
| silicon nitride (layer 4): | 504 Å |
| absorber (NbZrO$_x$) (layer 5): | 55 Å |
| silicon nitride (layer 6): | 222 Å |
| zirconium oxide (ZrO$_2$) (layer 7): | 51 Å |
| silicon nitride (layer 8): | 246 Å |
| absorber (NbZrO$_x$) (layer 9): | 643 Å |
| silicon nitride (layer 10): | 545 Å |
| absorber (NbZrO$_x$) (layer 11): | 226 Å |

TABLE 4-continued

Layer Stack of Example

| Layer | Physical thickness (Å) |
| --- | --- |
| silicon nitride (layer 12): | 254 Å |
| overcoat (ZrO$_2$) (layer 13): | 52 Å |

Measured before and after tempering (HT), the Example had the following characteristics (Ill. C, 2 degree observer, as with other optical data herein). All of the values below were taken before tempering, except for $\Delta E^*_G$ which was taken from data both before and after tempering.

TABLE 5

Measured Monolithic

| Parameter | Ex. 1 |
| --- | --- |
| T$_{vis}$ (TY) (transmission): | 0.01% |
| a*$_T$ | 0.1 |
| b*$_T$ | 0.06 |
| L*$_T$ | 0.13 |
| R$_G$Y (glass side refl. %): | 29% |
| a*$_G$: | −2.2 |
| b*$_G$: | 1.3 |
| L*$_G$: | 60.7 |
| $\Delta E^*_G$: | 1.15 |
| R$_F$Y (film side refl. %): | 18.8% |
| a*$_F$: | 3.9 |
| b*$_F$: | 30.2 |
| L*$_F$: | 50.4 |
| R$_s$ (ohms/square): | 17.2 |

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A backsplash coated article including a coating supported by a glass substrate, the coating comprising:
   a first dielectric layer;
   a first metal based absorber layer over at least the first dielectric layer;
   a second dielectric layer over at least the first dielectric layer and the first metal based absorber layer;
   a second metal based absorber layer on the glass substrate over at least the first and second dielectric layers and the first metal based absorber layer;
   a third dielectric layer on the glass substrate over at least the first and second dielectric layers and the first and second metal based absorber layer;
   a third metal based absorber layer on the glass substrate over at least the first, second and third dielectric layers and the first and second metal based absorber layers;
   a fourth dielectric layer on the glass substrate over at least the first, second and third dielectric layers and the first, second and third metal based absorber layers;
   wherein the backsplash coated article has a visible transmission of 0-4%; and
   wherein the backsplash coated article is configured to be adhered to a wall or floor so that the coating is to be located between at least the glass substrate and the wall or floor.

2. The backsplash coated article of claim 1, wherein the coated article is thermally tempered and has a glass side reflective $\Delta E^*$ value of no greater than 4.0 due to the thermal tempering.

3. The backsplash coated article of claim 1, wherein the coated article is thermally tempered and has a glass side reflective $\Delta E^*$ value of no greater than 3.0 due to the thermal tempering.

4. The backsplash coated article of claim 1, wherein the coated article is thermally tempered and has a glass side reflective $\Delta E^*$ value of no greater than 2.0 due to the thermal tempering.

5. The backsplash coated article of claim 1, wherein the coated article has a visible transmission of 0-3.0%.

6. The backsplash coated article of claim 1, wherein the coated article has a visible transmission of 0-1.0%.

7. The backsplash coated article of claim 1, wherein each of the first, second, and third metal based absorbing layers comprises material selected from one or more of NbZrO$_x$, NbZrN$_x$, NbZrO$_x$N$_y$, NiCrN$_x$, NiCrO$_x$, NiCrO$_x$N$_y$, NiCrMoO$_x$, NiCrMoN$_x$, NbCrO$_x$, NbCrN$_x$, NbCrO$_x$N$_y$, NbO$_x$ and NbN$_x$.

8. The backsplash coated article of claim 1, wherein each of the first, second, and third metal based absorbing layers comprises NbZr.

9. The backsplash coated article of claim 1, wherein each of the first, second, and third metal based absorbing layers comprises a suboxide of NbZr.

10. The backsplash coated article of claim 1, wherein each of the first, second, and third metal based absorbing layers comprises a nitride of NbZr.

11. The backsplash coated article of claim 1, wherein each of the first, second, and third metal based absorbing layers comprises an oxynitride of NbZr.

12. The backsplash coated article of claim 1, wherein one or more of the first, second, third and fourth dielectric layers comprises silicon nitride.

13. The backsplash coated article of claim 1, wherein each of the first, second, third, and fourth dielectric layers comprises silicon nitride.

14. The backsplash coated article of claim 1, wherein the coating further comprises a layer comprising zirconium oxide located over and directly contacting the third dielectric layer.

15. The backsplash coated article of claim 14, wherein the coating comprises another dielectric layer located over and directing contacting the layer comprising zirconium oxide and under the third metal-based absorber layer.

16. The backsplash coated article of claim 1, wherein the coating further comprises an overcoat comprising zirconium oxide.

17. The backsplash coated article of claim 1, wherein the coated article has a glass side reflective a* value of from −10 to +10.0.

18. The backsplash coated article of claim 1, wherein the coated article has a glass side reflective a* value of from −5.0 to +1.0.

19. The backsplash coated article of claim 1, wherein the coated article has a glass side reflective b* value of from −5.0 to +8.0.

20. The backsplash coated article of claim 1, wherein each of the metal based absorber layers comprises a nitride and/or suboxide of NbZr, wherein each of the metal based absorber layers contains at least twice as much Nb as Zr.

21. The backsplash coated article of claim 1, wherein the coating has a sheet resistance (R$_s$) of no greater than 25 ohms/square.

22. The backsplash coated article of claim 1, wherein the coated article has a glass side visible reflectance of from 25-35%.

23. A coated article including a coating supported by a glass substrate, the coating comprising:
a first dielectric layer;
a first metal based absorber layer over at least the first dielectric layer;
a second dielectric layer over at least the first dielectric layer and the first metal based absorber layer;
a second metal based absorber layer on the glass substrate over at least the first and second dielectric layers and the first metal based absorber layer;
a third dielectric layer on the glass substrate over at least the first and second dielectric layers and the first and second metal based absorber layer;
a third metal based absorber layer on the glass substrate over at least the first, second and third dielectric layers and the first and second metal based absorber layers;
a fourth dielectric layer on the glass substrate over at least the first, second and third dielectric layers and the first, second and third metal based absorber layers;
wherein the coated article has a visible transmission of 0-4%, a sheet resistance ($R_s$) of no greater than 40 ohms/square, and a glass side visible reflectance of from 15-40%; and
wherein the coated article is configured to be adhered to a wall so that the coating is to be located between at least the glass substrate and the wall.

24. The coated article of claim 23, wherein the coated article is a backsplash tile.

* * * * *